(12) United States Patent
Takabe et al.

(10) Patent No.: US 10,550,894 B2
(45) Date of Patent: Feb. 4, 2020

(54) CONSTANT VELOCITY UNIVERSAL JOINT

(71) Applicant: NTN CORPORATION, Osaka (JP)

(72) Inventors: Shinichi Takabe, Shizuoka (JP); Suguru Nishioka, Shizuoka (JP)

(73) Assignee: NTN CORPORATION, Osaka (JP)

( * ) Notice: Subject to any disclaimer, the term of this patent is extended or adjusted under 35 U.S.C. 154(b) by 266 days.

(21) Appl. No.: 15/551,379

(22) PCT Filed: Jan. 26, 2016

(86) PCT No.: PCT/JP2016/052060
§ 371 (c)(1),
(2) Date: Aug. 16, 2017

(87) PCT Pub. No.: WO2016/136355
PCT Pub. Date: Sep. 1, 2016

(65) Prior Publication Data
US 2018/0031047 A1    Feb. 1, 2018

(30) Foreign Application Priority Data

Feb. 25, 2015    (JP) .................................. 2015-035463

(51) Int. Cl.
*F16D 3/84*      (2006.01)
*F16J 15/52*     (2006.01)
(Continued)

(52) U.S. Cl.
CPC ................. *F16D 3/84* (2013.01); *F16D 3/24* (2013.01); *F16D 3/845* (2013.01); *F16J 3/04* (2013.01);
(Continued)

(58) Field of Classification Search
CPC ... F16D 3/84; F16D 3/845; F16D 3/24; F16D 2300/12; F16D 2003/22316; F16D 3/223;
(Continued)

(56) References Cited

U.S. PATENT DOCUMENTS

| 5,725,433 | A  | * | 3/1998 | Kudo   | F16D 3/845 |
|           |    |   |        |        | 464/175    |
| 6,244,967 | B1 | * | 6/2001 | Takabe | F16D 3/845 |
|           |    |   |        |        | 464/175    |

(Continued)

FOREIGN PATENT DOCUMENTS

| JP | 7-10562   | 2/1995 |
| JP | 09-177993 | 7/1997 |

(Continued)

OTHER PUBLICATIONS

Japanese Industrial Standard (JIS) K 6253 as filed by the inventor, Oct. 9, 2019. (Year: 2006).*

(Continued)

*Primary Examiner* — Greg Binda
(74) *Attorney, Agent, or Firm* — Wenderoth, Lind & Ponack, L.L.P.

(57) ABSTRACT

A constant velocity universal joint has a large-diameter mounting portion fastened and fixed by a first fastening clamp onto a boot receiving portion of an outer joint member, and a small-diameter mounting portion fastened and fixed by a second fastening clamp onto a boot receiving portion of a shaft. A circumferential clamp groove to which the first fastening clamp is fitted is formed in an outer peripheral surface of the large-diameter mounting portion. A protruding portion is formed at a boot outer side end portion of an inner peripheral surface of the large-diameter mounting portion. A recessed portion to which the protruding portion is fitted is formed in the boot receiving portion being a cylindrical surface of the outer joint member. A projection is formed in the vicinity of a boot inner side of the recessed portion.

22 Claims, 8 Drawing Sheets (51) Int. Cl.
  *F16J 3/04* (2006.01)
  *F16D 3/24* (2006.01)
  *F16D 3/223* (2011.01)
  *F16D 3/205* (2006.01)
(52) U.S. Cl.
  CPC .............. *F16J 3/041* (2013.01); *F16J 15/52* (2013.01); *F16D 3/2055* (2013.01); *F16D 3/223* (2013.01); *F16D 2003/22316* (2013.01); *F16D 2300/12* (2013.01); *Y10S 464/904* (2013.01)
(58) Field of Classification Search
  CPC . F16D 3/2055; F16J 3/041; F16J 15/52; F16J 3/04; Y10S 464/904
  USPC .................................................. 464/173, 175
  See application file for complete search history.

(56) References Cited

U.S. PATENT DOCUMENTS

| | | | |
|---|---|---|---|
| 6,547,669 B1 | 4/2003 | Neviani | |
| 6,695,706 B2 * | 2/2004 | Furuta | F16D 3/845 464/175 |
| 2009/0017923 A1 * | 1/2009 | Okubo | F16D 3/845 464/175 |

FOREIGN PATENT DOCUMENTS

| | | |
|---|---|---|
| JP | 2006-250363 | 9/2006 |
| JP | 2007-146959 | 6/2007 |
| JP | 2007-146960 | 6/2007 |
| JP | 2007-155003 | 6/2007 |
| JP | 2007-232144 | 9/2007 |
| JP | 2008-045675 | 2/2008 |
| WO | 2013/058059 | 4/2013 |

OTHER PUBLICATIONS

International Search Report dated May 10, 2016 in International (PCT) Application No. PCT/JP2016/052060.
Extended European Search Report dated Aug. 7, 2018 in corresponding European Patent Application No. 167551050.0.
International Preliminary Report on Patentability and Written Opinion of the International Searching Authority dated Aug. 29, 2017 in International (PCT) Application No. PCT/JP2016/052060.

* cited by examiner

CONSTANT VELOCITY UNIVERSAL JOINT

TECHNICAL FIELD

The present invention relates to a constant velocity universal joint, and more particularly, to a constant velocity universal joint to which a boot configured to seal an opening portion of an outer joint member is mounted.

BACKGROUND ART

A constant velocity universal joint which is to be incorporated into a power transmission mechanism of, for example, automobiles and various industrial machines receives a boot (boot for a constant velocity universal joint) mounted thereto for the purpose of preventing entry of foreign matters such as dusts into the joint or preventing leakage of grease sealed in the joint.

Figure 10:
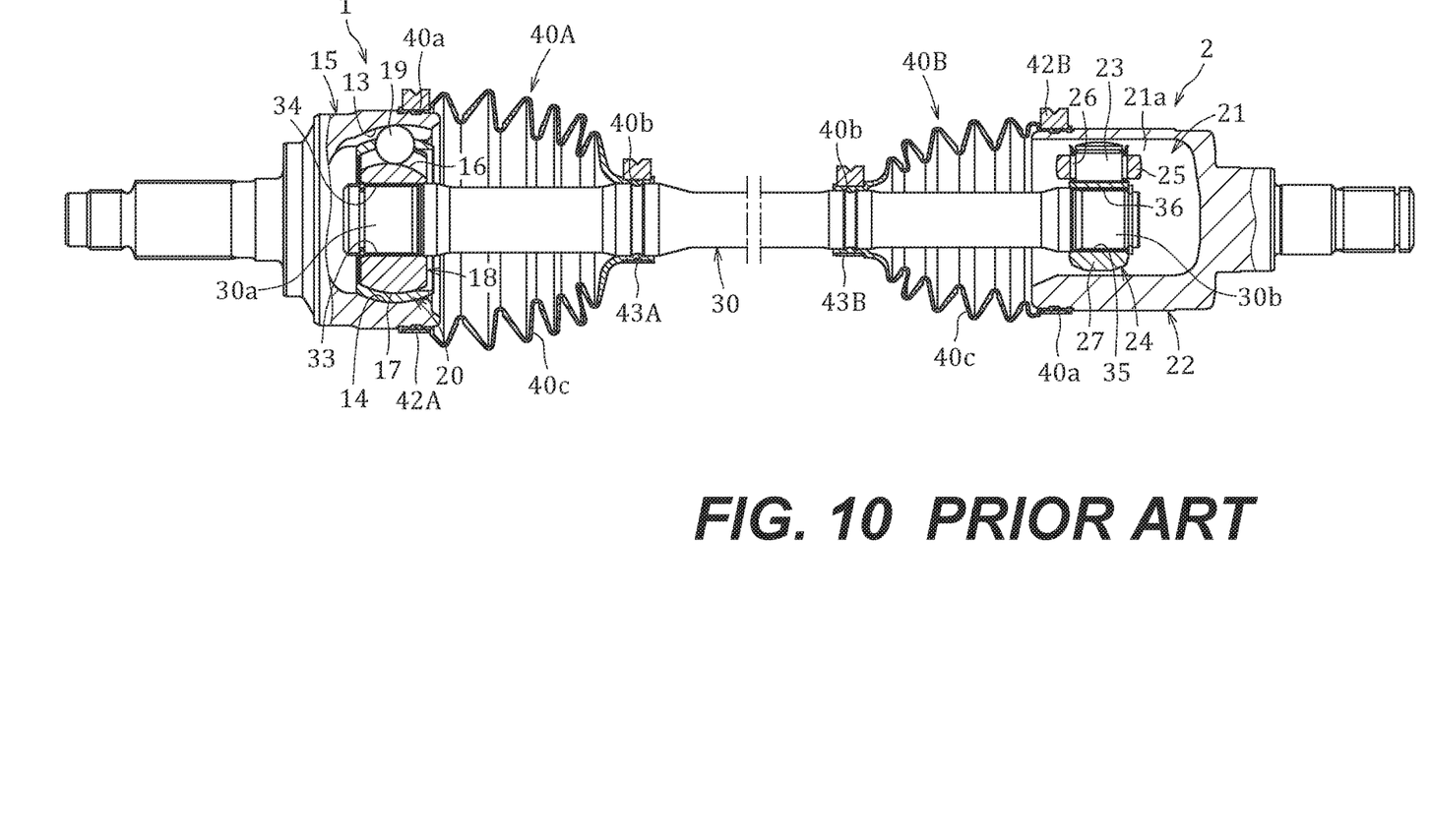
FIG. 10 is a sectional view of a drive shaft for which related-art constant velocity universal joints are used.

FIG. 10 is an illustration of a drive shaft. The drive shaft is obtained by connecting a fixed type constant velocity universal joint 1 and a plunging type constant velocity universal joint 2 to each other with a shaft 30. In the illustrated example, a Barfield-type constant velocity universal joint is used as the fixed type constant velocity universal joint 1, and a tripod type constant velocity universal joint is used as the plunging type constant velocity universal joint 2.

The fixed type constant velocity universal joint 1 includes an outer joint member 15, an inner joint member 18, a plurality of balls 19, and a cage 20. The outer joint member 15 includes a radially inner surface 14 having a plurality of tracks 13 extending in an axial direction. The inner joint member 18 includes a radially outer surface 17 having a plurality of tracks 16 extending in the axial direction. The plurality of balls 19 are interposed between the tracks 13 of the outer joint member 15 and the tracks 16 of the inner joint member 18 to transmit torque. The cage 20 is interposed between the radially inner surface 14 of the outer joint member 15 and the radially outer surface 17 of the inner joint member 18 to retain the balls 19.

The plunging type constant velocity universal joint 2 includes an outer joint member 22, a tripod member 24, and rollers 25. The outer joint member 22 has three grooves 21 extending in an axis direction on an inner periphery, and roller guide surfaces 21a opposed to each other are formed on inner walls of the grooves 21. The tripod member 24 includes three journals 23 protruding in a radial direction. The rollers 25 each serving as a torque transmission unit are supported on the journals 23 so as to be rotatable and are inserted to the grooves 21 of the outer joint member 22 so as to be rollable. In this case, the rollers 25 are externally fitted onto radially outer surfaces of the journals 23 through intermediation of a plurality of rollers 26 which are arranged along a circumferential direction. The tripod member 24 includes a boss portion 27 and the journals 23 extending in a radial direction from the boss portion 27.

The shaft 30 has male splines 30a and 30b formed at both end portions of the shaft 30. One male spline 30a is fitted into the inner joint member 18 of the fixed type constant velocity universal joint 1, and another male spline 30b is fitted into the tripod member 24 of the plunging type constant velocity universal joint 2. A female spline 34 is formed in an axial center hole 33 of the inner joint member 18, and the one male spline 30a of the shaft 30 is fitted into the axial center hole 33 of the inner joint member 18 and is brought into mesh with the female spline 34. Further, the another male spline 30b of the shaft 30 is fitted into an axial center hole 35 of the boss portion 27 of the tripod member 24 and is brought into mesh with a female spline 36 of the axial center hole 35.

A boot 40A configured to seal an opening portion of the outer joint member 15 is provided to the fixed type constant velocity universal joint 1. A boot 40B configured to seal an opening portion of the outer joint member 22 is provided to the plunging type constant velocity universal joint 2. Each of the boots 40A and 40B includes a large-diameter end portion 40a, a small-diameter end portion 40b, and a bellows portion 40c which connects the large-diameter end portion 40a and the small-diameter end portion 40b to each other. The large-diameter end portions 40a of the boots 40A and 40B are fastened and fixed by fastening clamps 42A and 42B at opening ends of the outer joint members 15 and 22, respectively. The small-diameter end portions 40b of the boots 40A and 40B are fastened and fixed by fastening clamps 43A and 43B at predetermined portions of the shaft, respectively.

Incidentally, the constant velocity universal joint has a function of rotating while taking an operating angle or a function of rotating while sliding in the axial direction. The boot is flexibly deformed so as to follow the actions of the constant velocity universal joint. Further, the constant velocity universal joint may be, for example, of a type which is capable of taking a large operating angle of equal to or more than $\theta=45$ degrees (Rzeppa type or Barfield type) or a type which is not capable of taking a considerably large angle but includes a mechanism configured to slide in an axial direction of the constant velocity universal joint (double-offset type, tripod type, or cross-groove type). Various mounting structures for the boot of such type have hitherto been proposed (see Patent Literature 1 to Patent Literature 6).

According to Patent Literature 1, a clamp groove is formed in an outer periphery of a mounting portion (fixing portion) of a boot. Dimensional and positional relationships are defined for projections and groove portions of a mating member (outer joint member or shaft), the boot fixing portion, and a clamp so as to cause the projections of the mating member to bite into the boot fixing portion, thereby improving sealability.

According to Patent Literature 2, a plurality of projections are formed on a boot receiving portion of a shaft, and a shaft mounting portion of a boot is fastened by a fastening clamp so that at least one of the projections has a compression set amount which is different from those of other projections.

According to Patent Literature 3, a pair of projections are formed on a boot receiving portion of a shaft, and a projection which is to be brought into press contact with the shaft is formed on a shaft mounting portion of a boot at a portion corresponding to a position between the pair of projections.

According to Patent Literature 4, a pair of projections are formed on a boot receiving portion of a shaft, and a recessed groove configured to retain lubricant delivered from an inside of a joint is formed on an inner side with respect to the projection formed on a boot inner side.

According to Patent Literature 5, an annular groove is formed in a boot receiving portion of a shaft, and a projection which is to be fitted into the annular groove is formed in an inner peripheral surface of a mounting portion of a boot. An interference between the boot and the shaft on a boot inner side with respect to the projection is set larger than an interference between the boot and the shaft on a boot outer side with respect to the projection.

According to Patent Literature 6, two or more clamp mounting grooves are formed in an outer peripheral surface of a mounting portion of a boot, and boot mounting grooves are formed in a shaft at positions corresponding to the clamp mounting grooves. Under a state in which the clamp mounting grooves and the boot mounting grooves correspond to each other, fastening clamp corresponding to the number of clamp mounting grooves are mounted, thereby improving sealability.

CITATION LIST

Patent Literature 1: JP 09-177993 A
Patent Literature 2: JP 2007-146959 A
Patent Literature 3: JP 2007-146960 A
Patent Literature 4: JP 2007-232144 A
Patent Literature 5: JP 2008-45675 A
Patent Literature 6: JP 2007-155003 A

SUMMARY OF INVENTION

Technical Problem

According to Patent Literature 1 to Patent Literature 4 described above, the long-time exposure under the high-temperature atmosphere may cause progression of compressive stress relaxation involving compression set in the mounting portion of the boot bitten by the projection of the mating member. Further, at the portion at which the flat portion formed on the inner side of the projection of the mating member, which is located on the innermost side, and the mounting portion of the boot are brought into contact with each other, the range of close contact through fastening by the fastening clamp becomes smaller. Therefore, when the constant velocity universal joint is rotated while taking the operating angle or sliding in the axial direction, the stress is repeatedly generated at the mounting portion of the boot, with the result that repeated deformation involving removal and contact with respect to the mating member may be caused in the portion of the boot on the joint inner side with respect to the projection of the mating member. Thus, there is a problem in that entry of the lubricant becomes more liable to occur, resulting in degradation of the sealability.

Further, according to Patent Literature 5, a projection is not formed on the shaft, and hence there is no portion to bite into the boot. Further, the interference is different between the inner side and the outer side of the projection on the boot side, and hence the balance is poor, with the result that the sealability is degraded. Further, the range on the inner side from the projection involving the close contact through fastening by the fastening clamp is small. Therefore, similarly to Patent Literature 1 to Patent Literature 4 described above, when the constant velocity universal joint is rotated while taking the operating angle or sliding in the axial direction, the stress is repeatedly generated at the boot fixing portion. Thus, there is a problem in that repeated deformation involving removal and contact with respect to the boot receiving portion of the shaft may be caused in the portion of the boot on the joint inner side, resulting in degradation of the sealability. According to Patent Literature 6, the number of components is large, and the structure is complicated, with the result that the problem of high cost may arise.

In view of the above, the present invention provides a constant velocity universal joint, which is capable of improving sealability, has a smaller number of components with a simple and compact structure, is capable of suppressing working cost, and is excellent in operability at the time of assembly.

Solution to Problem

According to a first embodiment of the present invention, there is provided a constant velocity universal joint, comprising: an outer joint member; an inner joint member; and a torque transmission member which is interposed between the outer joint member and the inner joint member, the outer joint member having an opening portion sealed with a boot, the boot comprising: a large-diameter mounting portion which is mounted to a boot receiving portion formed on a radially outer surface of the outer joint member on an opening portion side; a small-diameter mounting portion which is mounted to a boot receiving portion on a shaft fitted to the inner joint member; and a bent portion which connects the large-diameter mounting portion and the small-diameter mounting portion to each other, the large-diameter mounting portion being fastened and fixed by a fastening clamp in a state of being externally fitted onto the boot receiving portion of the outer joint member, the small-diameter mounting portion being fastened and fixed by a fastening clamp in a state of being externally fitted onto a boot receiving portion of the shaft, the large-diameter mounting portion comprising: a circumferential band groove to which the fastening clamp is fitted, the circumferential clamp groove being formed in an outer peripheral surface of the large-diameter mounting portion; and a protruding portion formed on a boot outer side end portion of the inner peripheral surface of the large-diameter mounting portion, the boot receiving portion being a cylindrical surface of the outer joint member comprising: a recessed portion to which the protruding portion of the large-diameter mounting portion is fitted; and a projection formed in a vicinity of a boot inner side of the recessed portion. The boot inner side corresponds to a side of the boot which is close to the bent portion of the boot, and the boot outer side corresponds to a side of the boot which is far from the bent portion of the boot.

According to a second embodiment of the present invention, there is provided a constant velocity universal joint, comprising: an outer joint member; an inner joint member; and a torque transmission member which is interposed between the outer joint member and the inner joint member, the outer joint member having an opening portion sealed with a boot, the boot comprising: a large-diameter mounting portion which is mounted to a boot receiving portion formed on a radially outer surface of the outer joint member on an opening portion side; a small-diameter mounting portion which is mounted to a boot receiving portion on a shaft fitted to the inner joint member; and a bent portion which connects the large-diameter mounting portion and the small-diameter mounting portion to each other, the large-diameter mounting portion being fastened and fixed by a fastening clamp in a state of being externally fitted onto the boot receiving portion of the outer joint member, the small-diameter mounting portion being fastened and fixed by a fastening clamp in a state of being externally fitted onto a boot receiving portion of the shaft, the small-diameter mounting portion comprising: a circumferential clamp groove to which the fastening clamp is fitted, the circumferential clamp groove being formed in an outer peripheral surface of the small-diameter mounting portion; and a protruding portion formed on a boot outer side end portion of the inner peripheral surface of the small-diameter mounting portion, the boot receiving portion being a cylindrical surface of the shaft comprising: a recessed portion to which the protruding portion of the small-diameter mounting portion is fitted; and a projection formed in a vicinity of a boot inner side of the recessed portion.

According to the constant velocity universal joint of the present invention, under a state in which the boot is mounted, the protruding portion of the boot on the mounting portion side is fitted to the recessed portion in a circumferential direction on the boot receiving portion side. In this manner, the mounting portion of the boot can be positioned with respect to the boot receiving portion. Further, the projection on the boot receiving portion side bites into the mounting portion side of the boot. In this case, the projection is opposed to the clamp groove on the boot side, and the projection can stably bite through fastening of the fastening clamp.

It is preferred that the projection be opposed to the circumferential clamp groove within a width direction range of the circumferential clamp and be positioned on a boot outer side from a center of the circumferential clamp groove in the width direction. With such setting, a relatively larger close-contact area can be secured between the cylindrical surface of the boot receiving portion and the cylindrical surface of the mounting portion of the boot. Moreover, the projection is arranged at a position far from the bent portion (for example, bellows portion) which connects the pair of mounting portions to each other. Therefore, the force caused by the repeated deformation of the bent portion becomes less liable to be transmitted.

A height dimension of the protruding portion of the boot may be set to a dimension which causes the protruding portion to be brought into close contact or into contact with the recessed portion to which the protruding portion is fitted. A cylindrical surface of the mounting portion of the boot, which is fitted to the boot receiving portion, may be fitted with an interference to the cylindrical surface of the boot receiving portion, and fastening by the fastening clamp may cause the projection of the boot receiving portion to bite into the mounting portion of the boot having the cylindrical surface shape from a radially inner side of the boot, to thereby cause the boot receiving portion having the cylindrical surface and the mounting portion of the boot having the cylindrical surface shape to be fixed in close contact with each other.

With such a configuration, the protruding portion of the boot is stably fitted to the recessed portion of the boot receiving portion. Further, the cylindrical surface of the mounting portion of the boot, which is mounted to the boot receiving portion, is fitted with the interference to the cylindrical surface of the boot receiving portion, thereby stabilizing the close contact between the mounting portion of the boot and the boot receiving portion.

A height of the projection of the boot receiving portion may be set equal to or more than 10% and equal to or less than 35% of a thickness of the mounting portion which is mounted to the boot receiving portion. A width dimension of the projection may be set equal to or less than 10% of a width dimension of the clamp groove. An axial length of a close-contact fixing portion between the cylindrical surface of the boot receiving portion and the cylindrical surface of the mounting portion of the boot may be set equal to or more than 65% of the width dimension of the clamp groove.

The height of the projection of the boot receiving portion is set equal to or more than 10% and equal to or less than 35% of the thickness of the mounting portion of the boot which is mounted to the boot receiving portion, thereby being capable of securing a biting amount which sufficiently achieves the leakage preventing function. That is, when the height of the projection is less than 10%, the protruding amount of the projection is excessively small, and hence the biting amount is small, with the result that the leakage preventing function cannot be sufficiently achieved. Further, when the height of the projection is more than 35%, the protruding amount of the projection is excessively large, and hence a large gap is formed between the boot receiving portion and the mounting portion of the boot, with the result that the close contact between the cylindrical surfaces is hindered.

When the width dimension of the projection is set equal to or less than 10% of the width dimension of the clamp groove, the close-contact area of the cylindrical surfaces can effectively be secured. That is, when the width dimension of the projection is excessively large, the close-contact area of the cylindrical surfaces becomes smaller. When the axial length of the close-contact fixing portion between the cylindrical surface of the boot receiving portion and the cylindrical surface of the mounting portion of the boot is set equal to or more than 65% of the width dimension of the clamp groove, the close contact between the cylindrical surface of the boot receiving portion and the cylindrical surface of the mounting portion of the boot can be secured. When the axial length is less than 65%, there is difficulty in securing the close contact.

It is preferred that a boot material be thermoplastic polyester elastomer having a type-D durometer hardness, which is defined by JIS K6253, of equal to or more than 35 and equal to or less than 55. When the hardness is less than 35, the boot is excessively soft, with the result that thermal resistance, rotational expansion performance, and the like of the boot are degraded. In contrast, when the hardness is more than 55, the boot is excessively hard, with the result that fatigability and wearability are degraded.

Advantageous Effects of Invention

According to the present invention, the projection can stably bite into the boot mounting portion, and a relatively larger close-contact area can be secured between the cylindrical surface of the boot receiving portion and the cylindrical surface of the mounting portion of the boot. Therefore, the mounting portion of the boot can be stably fixed to the boot receiving portion, thereby being capable of improving the sealability of the boot. Further, there are a smaller number of components with the simple and compact structure, and the working cost can be suppressed. Further, the operability at the time of assembly is not degraded.

That is, an axial length with a uniform close contact between the inner periphery of the mounting portion of the boot and the boot receiving portion is secured, and fastening is performed with the fastening clamp. Therefore, the stress which is generated in the boot receiving portion along with any deformation in the bent portion (bellows portion) of the boot is received, and hence the axial length portion with the uniform close contact maintains the close-contact state. Further, the annular projection formed on the boot receiving portion bites into the mounting portion of the boot on a joint outer side with respect to the axial length portion with the uniform close contact in an inner periphery of the mounting portion of the boot, to thereby prevent leakage of the lubricant, which enters the axial length portion with the uniform close-contact, to the outside.

DESCRIPTION OF EMBODIMENTS

Figure 1:
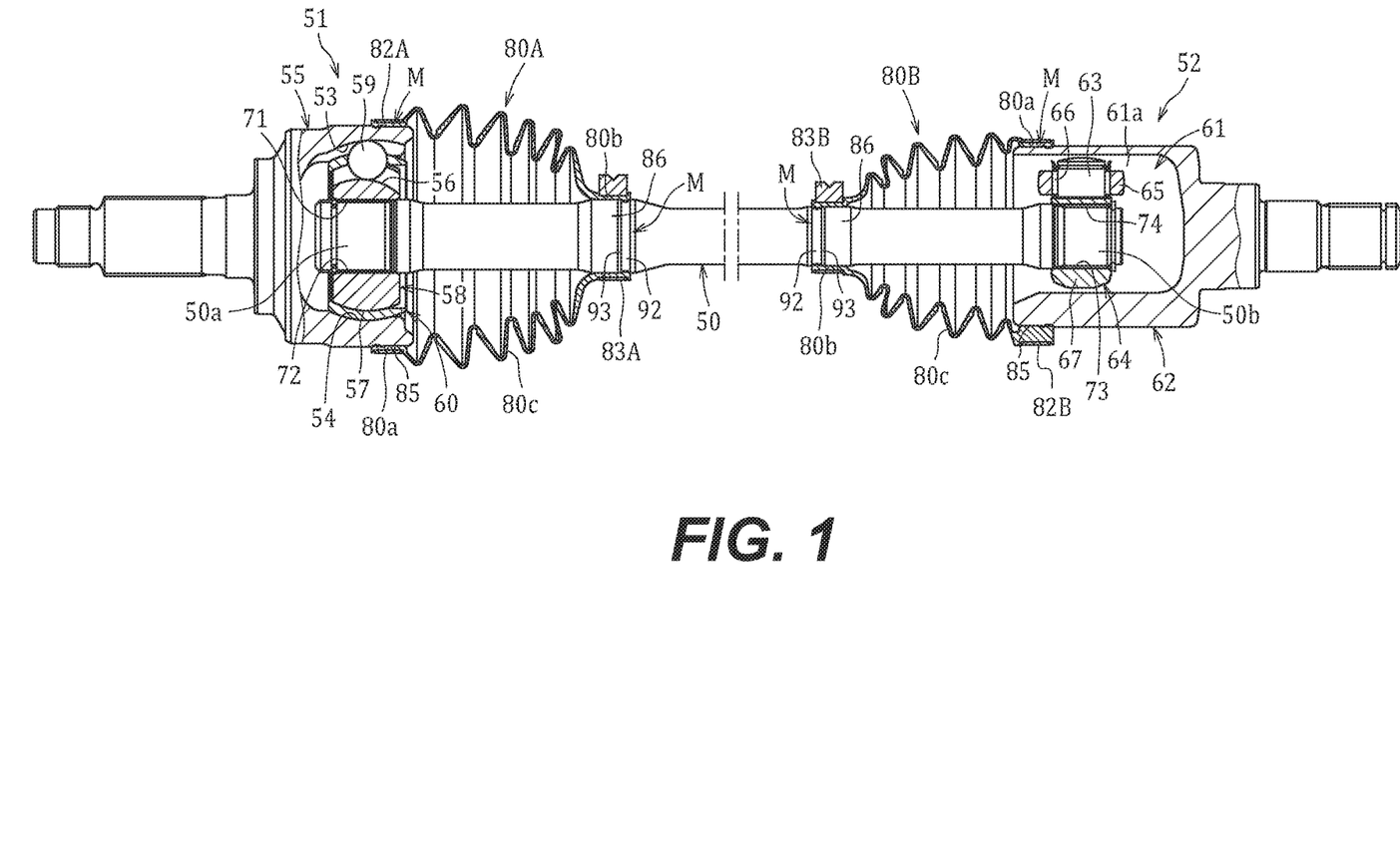
FIG. 1 is a sectional view of a drive shaft for which constant velocity universal joints according to the present invention are used.

Now, embodiment of the present invention is described with reference to FIG. 1 to FIG. 9. FIG. 1 is an illustration of a drive shaft. The drive shaft comprises a fixed type constant velocity universal joint 51, a plunging type constant velocity universal joint 52, and a shaft 50 configured to connect those constant velocity universal joints. In the illustrated example, a Barfield-type constant velocity universal joint is used as the fixed type constant velocity universal joint 51, and a tripod type constant velocity universal joint is used as the plunging type constant velocity universal joint 52.

The fixed type constant velocity universal joint 51 comprises an outer joint member 55, an inner joint member 58, a plurality of balls 59, and a cage 60. The outer joint member 55 includes a radially inner surface 54 having a plurality of tracks 53 extending in an axial direction. The inner joint member 58 includes a radially outer surface 57 having a plurality of tracks 56 extending in the axial direction. The plurality of balls 59 are interposed between the tracks 53 of the outer joint member 55 and the tracks 56 of the inner joint member 58 to transmit a torque. The cage 60 is interposed between the radially inner surface 54 of the outer joint member 55 and the radially outer surface 57 of the inner joint member 58 to retain the balls 59.

The plunging type constant velocity universal joint 52 comprises an outer joint member 62, a tripod member 64, and rollers 65. The outer joint member 62 has three grooves 61 extending in an axis direction in an inner periphery, and roller guide surfaces 61a opposed to each other are formed on inner walls of the grooves 61. The tripod member 64 serving as an inner joint member comprises three journals 63 protruding in a radial direction. The rollers 65 each serving as a torque transmission unit are supported on the journals 63 so as to be rotatable and are inserted to the grooves 61 of the outer joint member so as to be rollable. In this case, the rollers 65 are externally fitted onto radially outer surfaces of the journals 63 through intermediation of a plurality of rollers 66 which are arranged along a circumferential direction. The tripod member 64 comprises a boss portion 67 and the journals 63 extending in a radial direction from the boss portion 67.

The shaft 50 has male splines 50a and 50b formed at both end portions of the shaft 50. One male spline 50a is fitted into the inner joint member 58 of the fixed type constant velocity universal joint 51, and another male spline 50b is fitted into the tripod member 64 of the plunging type constant velocity universal joint 52. A female spline 72 is formed in an axial center hole 71 of the inner joint member 58, and the one male spline 50a of the shaft 50 is fitted into the axial center hole 71 of the inner joint member 58 and is brought into mesh with the female spline 72. Further, the another male spline 50b of the shaft 50 is fitted into an axial center hole 73 of the boss portion 67 of the tripod member 64 and is brought into mesh with a female spline 74 of the axial center hole 73.

A boot 80A configured to seal an opening portion of the outer joint member 15 is provided to the fixed type constant velocity universal joint 51. A boot 80B configured to seal an opening portion of the outer joint member 62 is provided to the plunging type constant velocity universal joint 52. Each of the boots 80A and 80B comprises a large-diameter mounting portion 80a, a small-diameter mounting portion 80b, and a bellows portion 80c which constructs a bent portion which connects the large-diameter mounting portion 80a and the small-diameter mounting portion 80b to each other. The large-diameter mounting portions 80a of the boots 80A and 80B are fastened and fixed by fastening clamps 82A and 82B at boot receiving portions 85 and 85 formed in the radially outer surfaces on the opening portion sides of the outer joint members 55 and 62, respectively. The small-diameter mounting portions 80b of the boots 80A and 80B are fastened and fixed by fastening clamps 83A and 83B at predetermined portions (boot receiving portions 86 and 86) of the shaft 50, respectively.

Figure 2:
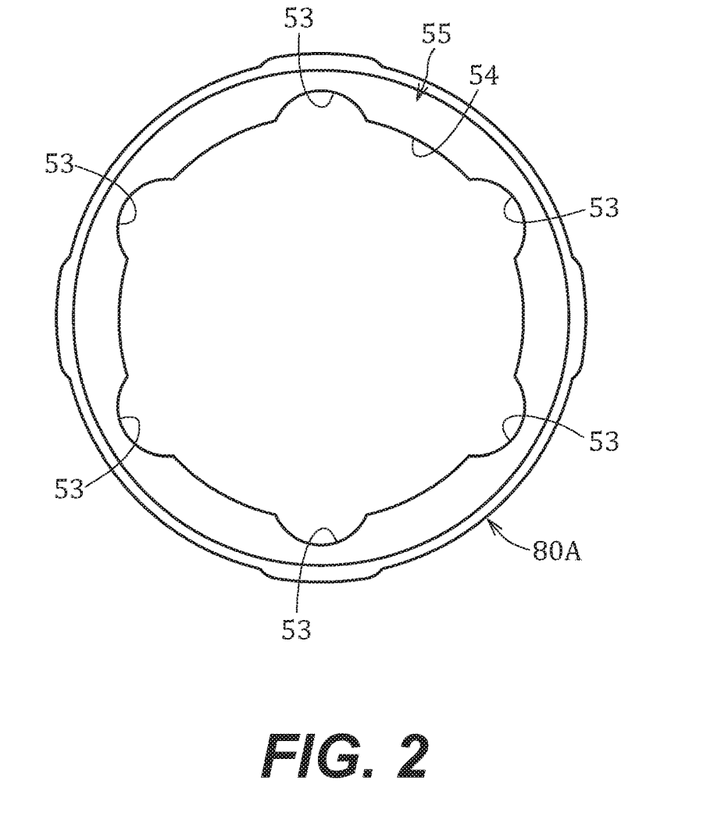
FIG. 2 is a front view of an outer joint member of a fixed type constant velocity universal joint of the drive shaft illustrated in FIG. 1.

That is, a boot mounting structure M is formed between the mounting portion 80a and the boot receiving portion 85 and between the mounting portion 80b and the boot receiving portion 86. First, with reference to FIG. 3, FIG. 4A, and FIG. 4B, description is made of the boot mounting structure M on the outer joint member 55 side on the fixed type constant velocity universal joint 51 side. As illustrated in FIG. 2, the outer joint member 55 of the fixed type constant velocity universal joint 51 has six tracks 53 in the inner surface 54. An outer periphery of the outer joint member 55 has a circular shape.

Figure 3:
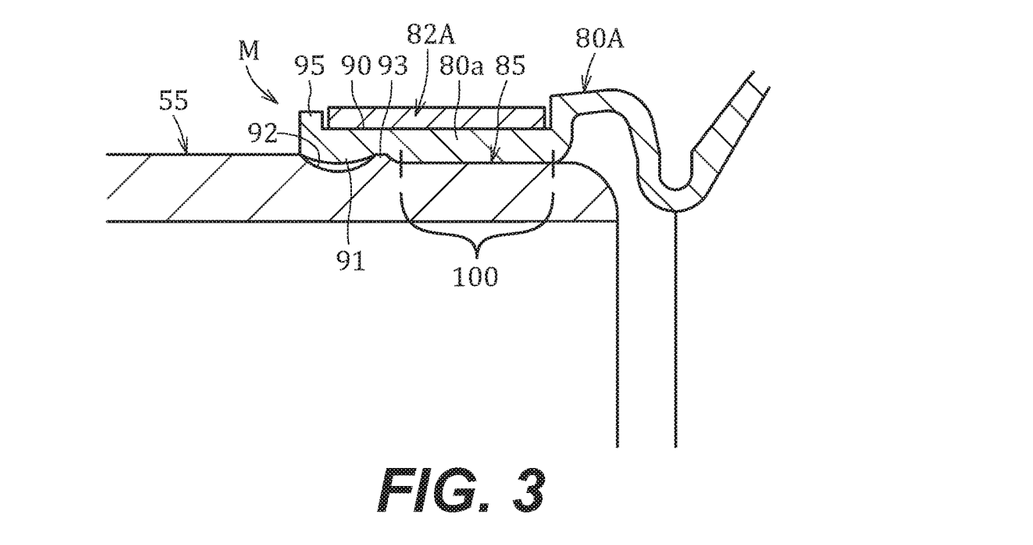
FIG. 3 is an enlarged sectional view of main parts of the outer joint member of the fixed type constant velocity universal joint of the drive shaft illustrated in FIG. 1.
Figure 4A:
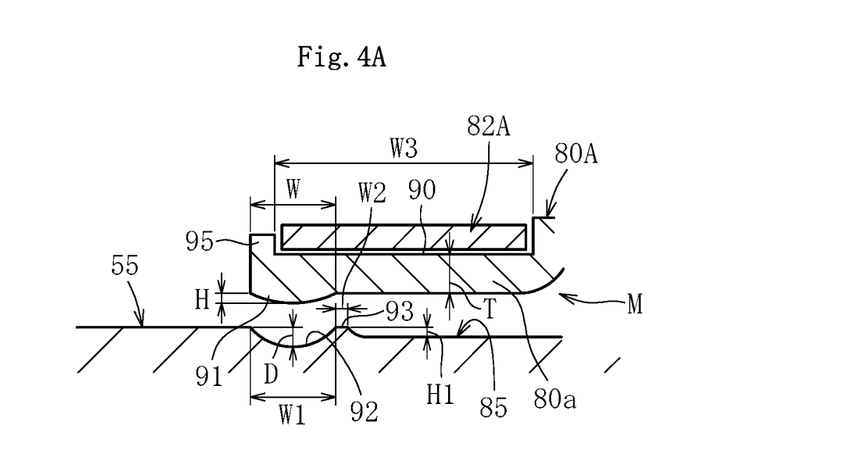
FIG. 4A is a sectional view for illustrating a relationship between a mounting portion of a boot and a boot receiving portion of the outer joint member before mounting the boot.
Figure 4B:
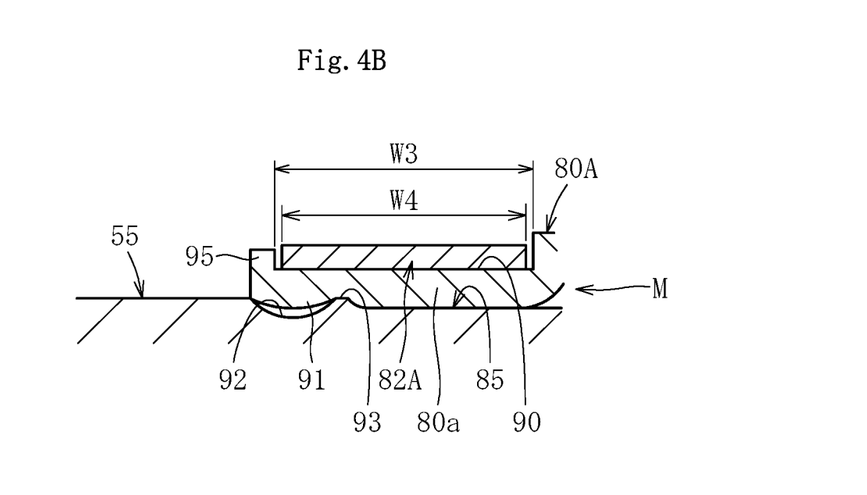
FIG. 4B is a sectional view for illustrating a relationship between the mounting portion of the boot and the boot receiving portion of the outer joint member after mounting the boot.

A circumferential clamp groove 90 to which the fastening clamp 82A is fitted is formed in an outer peripheral surface of the mounting portion 80a, and a protruding portion 91 is formed at a boot outer side end portion of an inner peripheral surface of the mounting portion 80a. Further, a recessed portion 92 to which the protruding portion 91 of the mounting portion 80a is fitted is formed at the boot receiving portion 85 being a cylindrical surface of the outer joint member 55, and a projection 93 is formed in the vicinity of the boot inner side of the recessed portion 92. The protruding portion 91 at the boot outer side end portion and the recessed portion 92 of the boot receiving portion 85 may be formed into an annular shape extending along the circumferential direction or be arranged at predetermined pitches along the circumferential direction. The projection 93 may also be formed into an annular shape extending along the circumferential direction or be arranged at predetermined pitches along the circumferential direction. The projection 93 can be opposed to the circumferential clamp groove 90 within a width direction range of the circumferential clamp (i.e., fastening clamp 82A) and be positioned on a boot outer side from a center of the circumferential clamp groove 90 in the width direction.

In this case, when the large-diameter mounting portion 80a of the boot 80A is mounted to the boot receiving portion 85 of the outer joint member 55, the protruding portion 91 of the large-diameter mounting portion 80a is fitted to the recessed portion 92 of the boot receiving portion 85, to thereby position the large-diameter mounting portion 80a of the boot with respect to the boot receiving portion 85.

Therefore, it is required that a width dimension W, a height dimension H, and the like of the protruding portion 91 are set to dimensions which enable fitting and positioning of the protruding portion 91 with respect to the recessed portion 92 of the boot receiving portion 85. When thermoplastic polyester elastomer is employed as a boot material, and the protruding portion 91 has a flat semi-elliptical cross-sectional shape as in the illustrated example, it is preferred that the height dimension H of the protruding portion 91 be from 20% to 40% of a thickness T of the large-diameter mounting portion 80a of the boot. When the height dimension H is less than 20% of the thickness T, the positioning function is insufficient. When the height dimension H is more than 40% of the thickness T, the mountability is rather degraded. Thus, in other words, the height dimension H of the protruding portion 91 of the boot may be set to a dimension which causes the protruding portion 91 to be brought into close contact or into contact with the recessed portion 92 to which the protruding portion 91 is fitted. A cylindrical surface of the mounting portion of the boot, which is fitted to the boot receiving portion, may be fitted with an interference to the cylindrical surface of the boot receiving portion, and fastening by the fastening clamp may cause the projection 93 of the boot receiving portion to bite into the mounting portion of the boot having the cylindrical surface shape from a radially inner side of the boot, to thereby cause the boot receiving portion having the cylindrical surface and the mounting portion of the boot having the cylindrical surface shape to be fixed in close contact with each other.

It is preferred that the width dimension W of the protruding portion 91 be from about 3 times to about 15 times, more preferably, from about 5 times to about 10 times larger than the height dimension H of the protruding portion 91. When the width dimension W is less than 3 times, the protruding portion 91 has a small volume and thus has a small rigidity, with the result that the positioning function is insufficient in some cases. The width dimension W which is more than 15 times is an unnecessary width, with the result that the compactness is impaired, and the positioning function is rather degraded in some cases.

Further, it is preferred that a position of the protruding portion 91 partially correspond to a position of the clamp groove 90. In this case, the compactness in the axial direction can further be improved. Through formation of the clamp groove 90, an end surface projection 95 is formed at the radially outer surface end portion of the mounting portion 80a. In this case, the width dimension, the height dimension, and the like of the end surface projection 95 may suitably be set, but the protruding portion 91 is arranged at a position corresponding to a position of the end surface projection 95. The width dimension of the protruding portion 91 and the width dimension of the end surface projection 95 may be set equal to each other. However, as described above, in consideration of fastening by the fastening clamp 82A, it is preferred that the position of the protruding portion 91 partially correspond to the position of the clamp groove 90.

It is only necessary that a width dimension W1 and a depth dimension D of the recessed portion 92 of the boot receiving portion 85 be set to dimensions required for positioning of the boot 80A. Excessively large dimensions are not desirable because the workability of the outer joint member 55 (shaft 50) and the strength of the outer joint member 55 (shaft 50) are degraded. The width dimension W1 of the recessed portion 92 of the boot receiving portion 85 is set substantially equal to the width dimension W of the protruding portion 91 along the boot end portion of the boot mounting portion 80a. Further, the depth dimension D of the recessed portion 92 of the boot receiving portion 85 is set equal to or more than 0.8 times, preferably, set substantially equal to the height dimension H of the protruding portion 91 along the boot end portion of the boot mounting portion 80a. When the depth dimension D is less than 0.8 times, the protruding portion 91 along the boot end portion of the boot receiving portion is born on a groove bottom of the boot receiving portion 85, with the result that the mountability and positioning performance of the boot 80A are degraded. When the depth dimension D of the recessed portion 92 of the boot receiving portion 85 is excessively large, the workability of the outer joint member 55 and the strength of the outer joint member 55 are degraded. Therefore, it is preferred that the depth dimension D be equal to or less than one-third of the width dimension W1 of the recessed portion 92.

When a height dimension H1 of the projection 93 formed on the boot inner side adjacent to the recessed portion 92 of the boot receiving portion 85 is excessively small, the biting amount is small, with the result that the leakage preventing function is insufficient. When the height dimension H1 of the projection 93 is excessively large, a gap which is formed between the boot receiving portion 85 and the boot mounting portion 80a is large, and hence the close contact of the cylindrical portions is hindered, with the result that the leakage preventing function is degraded. Therefore, it is preferred that the height dimension H1 of the projection 93 be equal to or more than 10% and equal to or less than 35% of the thickness T of the boot mounting portion 80a. Further, when a width dimension W2 of the projection 93 is excessively large, a close-contact area between the cylindrical portion of the boot receiving portion 85 and the cylindrical inner peripheral surface of the boot mounting portion is reduced, and the close contact is hindered. Therefore, it is preferred that the width dimension W2 of the projection 93 be equal to or less than 10% of a clamp groove width W3 of the boot mounting portion 80a.

It is intended that the cylindrical portion of the boot receiving portion 85 and the cylindrical inner peripheral surface of the boot mounting portion 80a be brought into close contact with each other through fastening by the fastening clamp 82A. The close-contact area (i.e., a close-contact fixing portion 100 illustrated in FIG. 3) is kept large to receive a twisting force in a circumferential direction, a force in the axial direction, and a force of vertical movement, which are caused by deformation of the boot bellows portion 80c when the constant velocity universal joint takes the operating angle or rotates while sliding, thereby suppressing deformation of the boot mounting portion 80a. Therefore, in order to secure a sufficient close-contact area, the annular projection of the boot receiving portion 85 is formed at a position closer to the boot outer side with respect to a center of the clamp groove 90 of the boot mounting portion 80a and the fastening clamp 82A. 82A.

This means that the axial length along which the cylindrical portion of the boot receiving portion 85 and the cylindrical inner peripheral surface of the boot mounting portion 80a are in close contact with each other is equal to or more than 50% of the clamp groove width W3 in the outer periphery of the boot receiving portion and a width W4 of the fastening clamp 82A. More preferably, the axial length of equal to or more than 65% is secured. It is preferred that the width W4 of the fastening clamp 82A have a dimension substantially equal to the clamp groove width W3 of the boot mounting portion 80a or be equal to or more than 90% of the clamp groove width.

It is preferred that the boot material be thermoplastic polyester elastomer having a type-D durometer hardness, which is based on JIS K6253, of equal to or more than 35 and equal to or less than 55 (from 35 to 55). When a material having a hardness of less than 35 is employed, the thermal resistance and the rotational expansion performance of the boot are degraded. When a material having a hardness of more than 55 is employed, the fatigability and the wearability are degraded. As a result, the performance required for the boot is not satisfied.

Also on the small-diameter mounting portion 80b side of the boot 80A for the fixed type constant velocity universal joint 51, the circumferential clamp groove 90 to which the fastening clamp 83A is fitted is formed in the outer peripheral surface of the mounting portion 80b, and the protruding portion 91 is formed at the boot outer side end portion of the inner peripheral surface of the mounting portion 80b. Further, the recessed portion 92 to which the protruding portion 91 of the mounting portion 80b is fitted is formed in the boot receiving portion 86 being the cylindrical surface of the shaft 50, and the projection 93 is formed in the vicinity of the boot inner side of the recessed portion 92.

Figure 5:
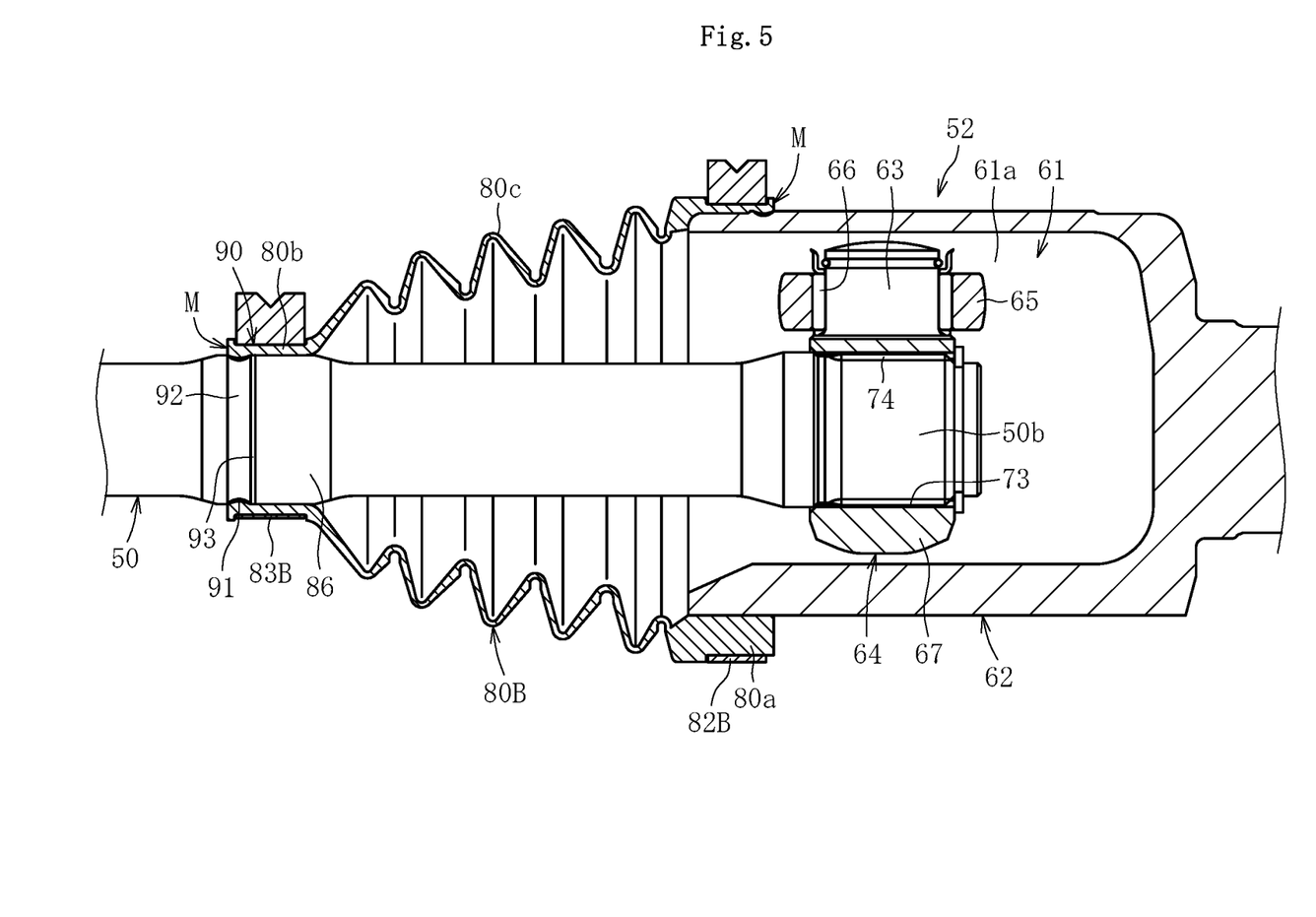
FIG. 5 is a sectional view of an outer joint member in which a radially outer surface is a non-cylindrical surface.
Figure 6:
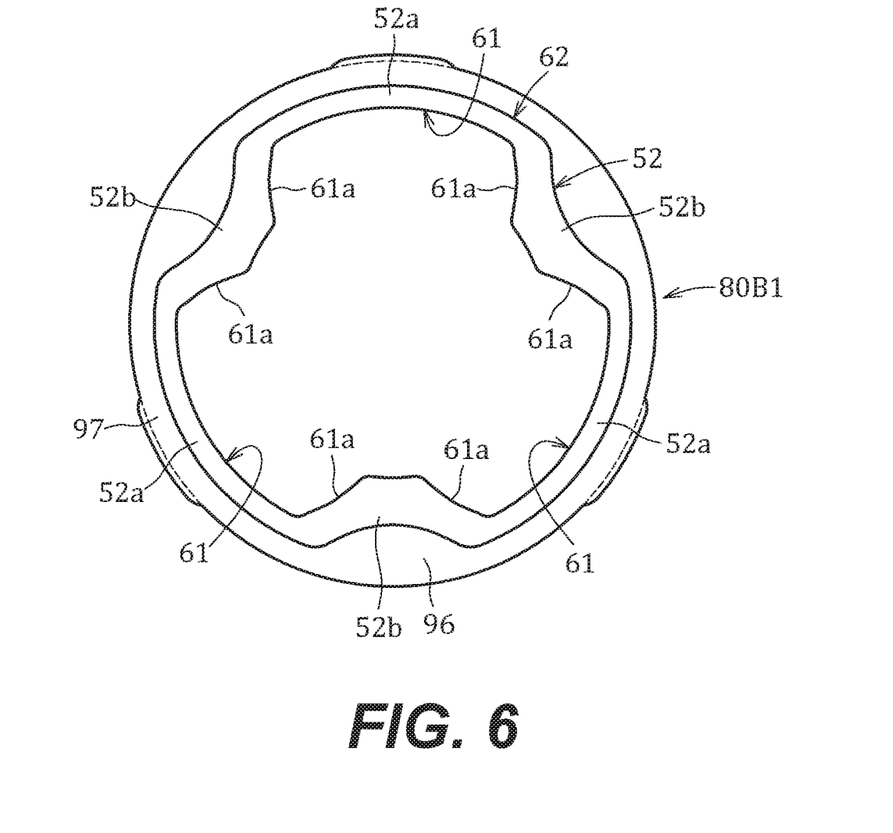
FIG. 6 is a front view of the outer joint member illustrated in FIG. 5.
Figure 7:
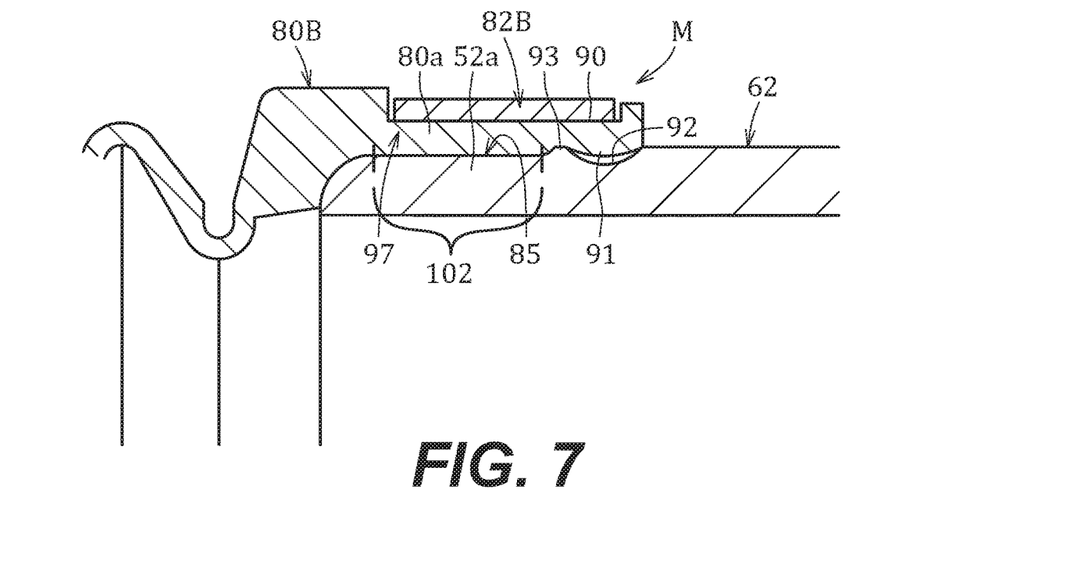
FIG. 7 is an enlarged sectional view of main parts of the outer joint member under a state in which the boot is mounted.

As illustrated in FIG. 5 to FIG. 7, the circumferential clamp groove 90 to which the fastening clamp 82B is fitted is formed in the outer peripheral surface of the mounting portion 80a of the boot 80B for the plunging type constant velocity universal joint 52, and the protruding portion 91 is formed at the boot outer side end portion of the inner peripheral surface of the mounting portion 80a. Further, the recessed portion 92 to which the protruding portion 91 of the mounting portion 80a is fitted is formed in the boot receiving portion 85 being the cylindrical surface of the outer joint member 62, and the projection 93 is formed in the vicinity of the boot inner side of the recessed portion 92.

Also on the small-diameter mounting portion 80b side of the boot 80B for the plunging type constant velocity universal joint 52, the circumferential clamp groove 90 to which the fastening clamp 83B is fitted is formed in the outer peripheral surface of the mounting portion 80b, and the protruding portion 91 is formed at the boot outer side end portion of the inner peripheral surface of the mounting portion 80b. Further, the recessed portion 92 to which the protruding portion 91 of the mounting portion 80b is fitted is formed in the boot receiving portion 86 being the cylindrical surface of the shaft 50, and the projection 93 is formed in the vicinity of the boot inner side of the recessed portion 92.

Through use of such a boot mounting structure, when the fastening clamp 82A (82B, 83A, or 83B) which is fitted to the clamp groove 90 is fastened, the projection 93 of the boot receiving portion 85 (86) bites into a part of the cylindrical inner peripheral surface of the boot mounting portion 80a (80b), and the cylindrical inner peripheral surface of the boot mounting portion 80a (80b) is brought into close contact with the cylindrical surface of the boot receiving portion 85 (86). A sufficient close-contact area (i.e., the close-contact fixing portion 100 illustrated in FIG. 3, a close-contact fixing portion 102 illustrated in FIG. 7, and a close-contact fixing portion 104 illustrated in FIG. 8B) of the cylindrical inner peripheral surface is secured, and hence, even when the twisting force in the circumferential direction, the force in the axial direction, and the force of vertical movement, which are caused by deformation of the boot bellows portion 80c when the constant velocity universal joint rotates while taking the operating angle or sliding, are repeatedly received, the cylindrical portion of the boot mounting portion 80a (80b) is firmly fixed, thereby being capable of suppressing the deformation of the boot mounting portion 80a (80b).

Further, the portion of the boot mounting portion 80a (80b) which is bitten by the projection 93 of the boot clamp receiving portion 85 (86) is firmly fixed by the fastening clamp 82A (82B, 83A, or 83B), and the force caused by the repeated deformation of the boot bellows portion 80c is hardly transmitted. Therefore, deformation of the boot mounting portion 80a (80b) is suppressed, thereby being capable of suppressing reduction in the biting force. As a result, a minute gap formed between the boot receiving portion 85 (86) and the boot mounting portion 80a (80b) can be minimized, and the relative movement of the boot receiving portion 85 (86) and the boot mounting portion 80a (80b) can be reduced, thereby being capable of preventing entry of lubricant (grease), which is sealed in the constant velocity universal joint, into the gap. A small amount of the lubricant which enters the gap even with the above-mentioned configuration is completely prevented from leaking to the outside because the projection 93 formed on the boot receiving portion 85 (86) stably bites into the inner periphery of the boot mounting portion.

As illustrated in FIG. 6, the outer joint member 62 of the plunging type constant velocity universal joint 52 illustrated in FIG. 5 comprises large-diameter portions 52a, which correspond to groove bottoms of the grooves 61, and small-diameter portions 52b each located between the adjacent grooves 61. Therefore, the outer joint member 62 has a non-cylindrical surface shape. In this case, the radially outer surfaces of the large-diameter portions 52a are cylindrical surfaces.

Therefore, as illustrated in FIG. 6, the large-diameter mounting portion 80a of the boot 80B comprises large-thickness portions 96 and small-thickness portions 97. Therefore, the protruding portion 91 is formed on the radially inner surface of each small-thickness portion 97, and the recessed portion 92 and the projection 93 of the outer joint member 55 are formed on the radially outer surface of the large-diameter portion 52a. Further, together with the formation of the recessed portion 92 and the projection 93, the protruding portion 91 maybe formed on the radially inner surface of the large-thickness portion 96, and the recessed portion 92 and the projection 93 of the outer joint member 55 may be formed on the radially outer surface of the small-diameter portion 52b.

Figure 8A:
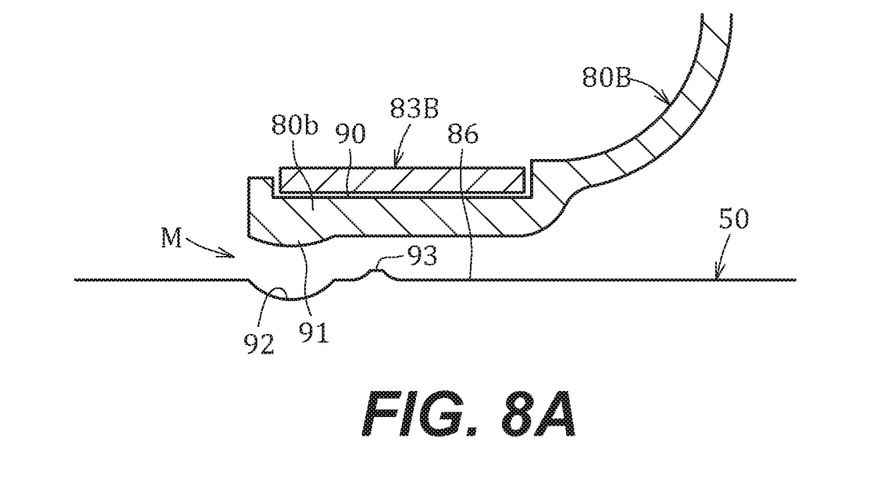
FIG. 8A is a sectional view for illustrating a relationship between a mounting portion of the boot and another boot receiving portion before mounting the boot.
Figure 8B:
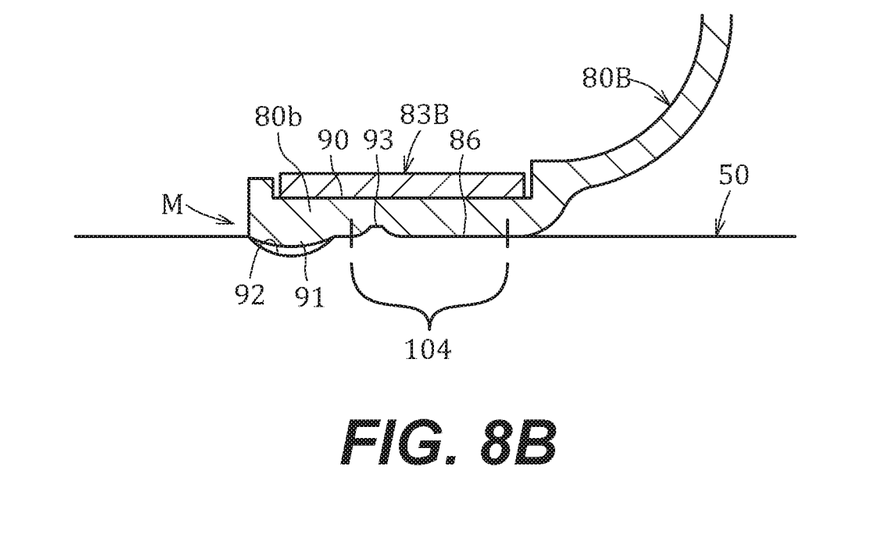
FIG. 8B is a sectional view for illustrating a relationship between the mounting portion of the boot and the another boot receiving portion after mounting the boot.

In FIG. 8A and FIG. 8B, the projection 93 of the boot receiving portion 86 is located further on the boot inner side as compared to the above-mentioned embodiment. The projection 93 is located at a position within the range which is capable of securing a sufficient close-contact area between the cylindrical surface of the boot receiving portion 86 and the cylindrical surface of the boot mounting portion 80b, stably fixing the cylindrical portion of the mounting portion 80b of the boot 80B, and suppressing the deformation of the boot mounting portion 80b.

Figure 9A:
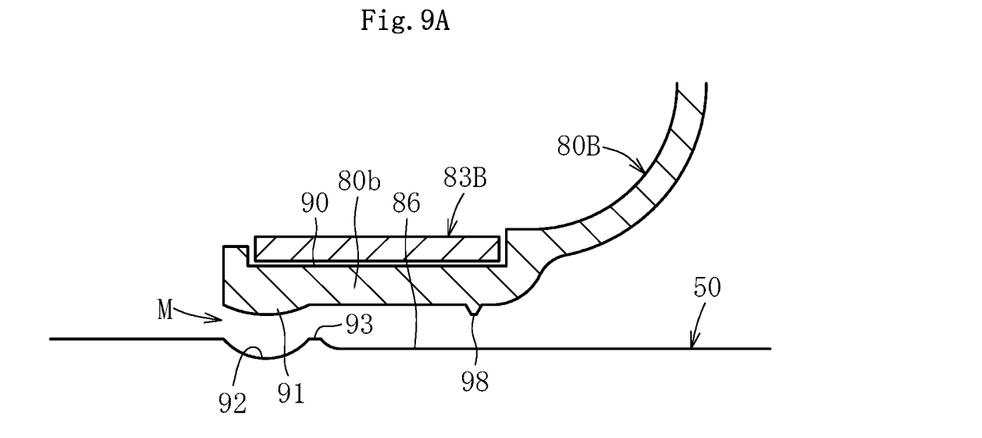
FIG. 9A is a sectional view for illustrating a relationship between a mounting portion of another boot and a boot receiving portion of the outer joint member before mounting the another boot.
Figure 9B:
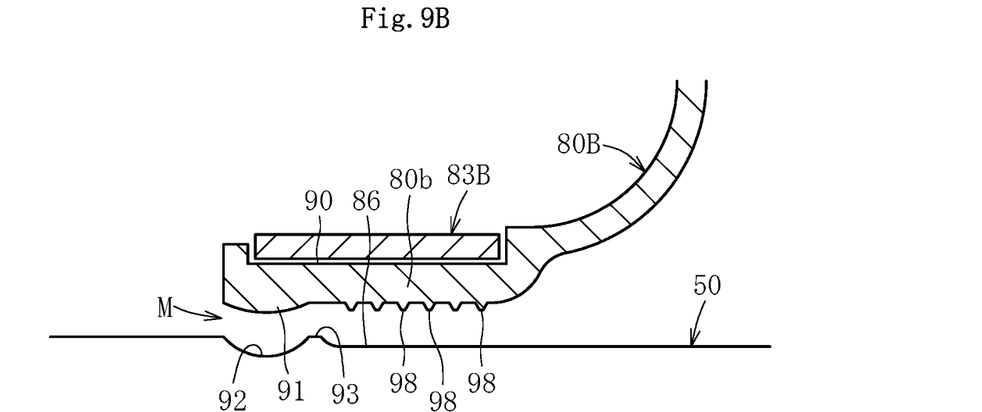
FIG. 9B is a sectional view for illustrating a relationship between a mounting portion of another boot and a boot receiving portion of the outer joint member before mounting the another boot.

Further, in FIG. 9A, a small projection 98 is formed on the radially inner surface of the mounting portion 80b of the boot 80B. Similarly to the projection 93, the small projection 98 is located at a position within the range which is capable of securing a sufficient close-contact area between the cylindrical surface of the boot receiving portion 86 and the cylindrical surface of the boot mounting portion 80b. Therefore, as illustrated in FIG. 9B, a plurality of small projections 98 may be formed along the axial direction. When the small projection 98 is formed, it is preferred that a height dimension of the small projection 98 be smaller than the height dimension of the protruding portion 91. When the height dimension of the small projection 98 is larger than the height dimension of the protruding portion 91, there is possibility that the positioning function through fitting of the protruding portion 91 to the recessed portion 92 cannot be achieved.

In the above, description is made of the embodiment of the present invention. However, the present invention is not limited to the above-mentioned embodiment, and various modification may be made. In the above-mentioned embodiment, the protruding portion 91 has a flat semi-elliptical cross-sectional shape. However, the cross-sectional shape of the protruding portion 91 is not limited thereto, and may be a semi-circular shape, a semi-polygonal shape, a rectangular shape, or the like. Therefore, a cross-sectional shape of the recessed portion 92 to which the protruding portion 91 is fitted may be a semi-circular shape, a semi-polygonal shape, a rectangular shape, or the like. Further, in the above-mentioned embodiment, the projection 93 has a cross-sectional shape of like (like a flat chevron mark) shape, which is a cross-sectional shape having a trapezoidal shape in which both sides form a gently curved recessed surface on the bottom side. However, the cross-sectional shape of the projection 93 is not limited thereto, and may be a trapezoidal shape or the like. When the plurality of small projections 98 are formed as illustrated in FIG. 9B, the number, arrangement pitch, and the like of the small projections 98 may be suitably set.

The boot mounting structure M illustrated in FIGS. 8 and FIGS. 9 is provided on the small-diameter mounting portion 80b side of the boot 80B for the plunging type constant velocity universal joint 52. However, the boot mounting structure M may be used for the large-diameter mounting portion 80a side of the boot 80B, and may further be used for the large-diameter mounting portion 80a side and the small-diameter mounting portion 80b side of the boot 80A for the fixed type constant velocity universal joint.

Further, in the above-mentioned embodiment, the boot mounting structure M on each of the large-diameter side and the small-diameter side of the boot for each of the fixed type constant velocity universal joint and the plunging type constant velocity universal joint has the configuration of the present invention, which comprises the protruding portion 91 formed on the inner peripheral surface of the mounting portion 80a (80b), the recessed portion 92 formed in the boot receiving portion 85 (86), and the projection 93 formed in the vicinity of the recessed portion 92. However, it is only necessary that the boot mounting structure M be provided on any one of the large-diameter side and the small-diameter side.

INDUSTRIAL APPLICABILITY

The fixed type constant velocity universal joint may be a Barfield-type constant velocity universal joint or an undercut-free constant velocity universal joint, and the plunging type constant velocity universal joint maybe a tripod type constant velocity universal joint, a double-offset constant velocity universal joint, or a cross-groove constant velocity universal joint. The constant velocity universal joint may be used for a propeller shaft other than the drive shaft. Further, when the tripod type constant velocity universal joint is used as the plunging type constant velocity universal joint, a single roller type or a double roller type may be used.

REFERENCE SIGNS LIST 55, 62 outer joint member
58 inner joint member
59 ball
64 tripod member
65 roller
80A, 80B boot
80b mounting portion
80c bellows portion
82A, 82B, 83A, 83B fastening clamp
85, 86 boot receiving portion
90 circumferential clamp groove
91 protruding portion
92 recessed portion
93 projection

The invention claimed is:
1. A constant velocity universal joint comprising:
an outer joint member having an opening portion and a radially outer surface with a boot receiving portion;
an inner joint member;
a torque transmission member which is interposed between the outer joint member and the inner joint member; and
a boot which seals the opening portion of the outer joint member, wherein
the boot comprises:
a large-diameter mounting portion which is mounted to the boot receiving portion of the outer joint member on an opening portion side;
a small-diameter mounting portion which is mounted to a boot receiving portion on a shaft fitted to the inner joint member; and
a bent portion which connects the large-diameter mounting portion and the small-diameter mounting portion to each other,
the large-diameter mounting portion is fastened and fixed by a first fastening clamp in a state of being externally fitted onto the boot receiving portion of the outer joint member,
the small-diameter mounting portion is fastened and fixed by a second fastening clamp in a state of being externally fitted onto the boot receiving portion of the shaft, the large-diameter mounting portion comprises:
  an outer peripheral surface having formed therein a circumferential clamp groove to which the first fastening clamp is fitted; and
  an inner peripheral surface having a protruding portion formed on a boot outer side end portion of the inner peripheral surface of the large-diameter mounting portion,
the boot receiving portion of the outer joint member has a cylindrical surface and comprises:
  a recessed portion to which the protruding portion of the large-diameter mounting portion is fitted; and
  a projection formed in a vicinity of a boot inner side of the recessed portion, there being one projection at the boot receiving portion of the outer joint member.

2. The constant velocity universal joint according to claim 1, wherein the projection is opposed to the circumferential clamp groove and is located at a position closer to a boot outer side of the large-diameter portion in an axial direction than a center of the circumferential clamp groove in the axial direction.

3. The constant velocity universal joint according to claim 2,
  wherein the protruding portion has a height dimension such that the protruding portion is brought into close contact or into contact with the recessed portion to which the protruding portion is fitted, and
  wherein a cylindrical surface of the inner peripheral surface of the large-diameter mounting portion is fitted with interference to the cylindrical surface of the boot receiving portion, and fastening by the first fastening clamp causes the projection of the boot receiving portion to bite into the cylindrical surface of the inner peripheral surface of the large-diameter mounting portion from a radially inner side of the boot, to thereby cause the boot receiving portion of the outer joint member having the cylindrical surface and the large-diameter mounting portion having the cylindrical surface to be fixed in close contact with each other.

4. The constant velocity universal joint according to claim 3,
  wherein a height of the projection of the boot receiving portion is set equal to or more than 10% and equal to or less than 35% of a thickness of the large-diameter mounting portion which is mounted to the boot receiving portion,
  wherein a width in the axial direction of the projection is set equal to or less than 10% of the width of the circumferential clamp groove, and
  wherein a length in the axial direction of a close-contact fixing portion where the cylindrical surface of the boot receiving portion and the cylindrical surface of the inner peripheral surface of the large-diameter mounting portion contact each other is set equal to or more than 65% of the width of the circumferential clamp groove.

5. The constant velocity universal joint according to claim 2,
  wherein a height of the projection of the boot receiving portion is set equal to or more than 10% and equal to or less than 35% of a thickness of the large-diameter mounting portion which is mounted to the boot receiving portion,
  wherein a width in the axial direction of the projection is set equal to or less than 10% of the width of the circumferential clamp groove, and
  wherein a length in the axial direction of a close-contact fixing portion where the cylindrical surface of the boot receiving portion and a cylindrical surface of the inner peripheral surface of the large-diameter mounting portion contact each other is set equal to or more than 65% of the width of the circumferential clamp groove.

6. The constant velocity universal joint according to claim 2, wherein the boot comprises thermoplastic polyester elastomer having a type-D durometer hardness, which is defined by JIS K6253, of equal to or more than 35 and equal to or less than 55.

7. The constant velocity universal joint according to claim 1,
  wherein the protruding portion has a height dimension such that the protruding portion is brought into close contact or into contact with the recessed portion to which the protruding portion is fitted, and
  wherein a cylindrical surface of the inner peripheral surface of the large-diameter mounting portion is fitted with interference to the cylindrical surface of the boot receiving portion, and fastening by the first fastening clamp causes the projection of the boot receiving portion to bite into the cylindrical surface of the inner peripheral surface of the large-diameter mounting portion from a radially inner side of the boot, to thereby cause the boot receiving portion of the outer joint member having the cylindrical surface and the large-diameter mounting portion having the cylindrical surface to be fixed in close contact with each other.

8. The constant velocity universal joint according to claim 7,
  wherein a height of the projection of the boot receiving portion is set equal to or more than 10% and equal to or less than 35% of a thickness of the large-diameter mounting portion which is mounted to the boot receiving portion,
  wherein a width in an axial direction of the projection is set equal to or less than 10% of the width of the circumferential clamp groove, and
  wherein a length in the axial direction of a close-contact fixing portion where the cylindrical surface of the boot receiving portion and the cylindrical surface of the inner peripheral surface of the large-diameter mounting portion contact each other is set equal to or more than 65% of the width of the circumferential clamp groove.

9. The constant velocity universal joint according to claim 7, wherein the boot comprises thermoplastic polyester elastomer having a type-D durometer hardness, which is defined by JIS K6253, of equal to or more than 35 and equal to or less than 55.

10. The constant velocity universal joint according to claim 1,
  wherein a height of the projection of the boot receiving portion is set equal to or more than 10% and equal to or less than 35% of a thickness of the large-diameter mounting portion which is mounted to the boot receiving portion,
  wherein a width in an axial direction of the projection is set equal to or less than 10% of the width of the circumferential clamp groove, and
  wherein a length in the axial direction of a close-contact fixing portion where the cylindrical surface of the boot receiving portion and a cylindrical surface of the inner peripheral surface of the large-diameter mounting portion contact each other is set equal to or more than 65% of the width of the circumferential clamp groove.

11. The constant velocity universal joint according to claim 1, wherein the boot comprises thermoplastic polyester elastomer having a type-D durometer hardness, which is defined by JIS K6253, of equal to or more than 35 and equal to or less than 55.

12. The constant velocity universal joint according to claim 1,
wherein a cylindrical surface of the inner peripheral surface of the large-diameter mounting portion has at least one projection extending therefrom, and
wherein a height of the at least one projection is smaller than a height of the protruding portion.

13. A constant velocity universal joint comprising:
an outer joint member having an opening portion and a radially outer surface with a boot receiving portion;
an inner joint member;
a torque transmission member which is interposed between the outer joint member and the inner joint member; and
a boot which seals the opening portion of the outer joint member, wherein
the boot comprises:
a large-diameter mounting portion which is mounted to the boot receiving portion of the outer joint member on an opening portion side;
a small-diameter mounting portion which is mounted to a boot receiving portion on a shaft fitted to the inner joint member; and
a bent portion which connects the large-diameter mounting portion and the small-diameter mounting portion to each other,
the large-diameter mounting portion is fastened and fixed by a first fastening clamp in a state of being externally fitted onto the boot receiving portion of the outer joint member,
the small-diameter mounting portion is fastened and fixed by a second fastening clamp in a state of being externally fitted onto the boot receiving portion of the shaft,
the small-diameter mounting portion comprises:
an outer peripheral surface having formed therein a circumferential clamp groove to which the second fastening clamp is fitted; and
an inner peripheral surface having a protruding portion formed on a boot outer side end portion of the inner peripheral surface of the small-diameter mounting portion,
the boot receiving portion of the shaft has cylindrical surface and comprises:
a recessed portion to which the protruding portion of the small-diameter mounting portion is fitted; and
a projection formed in a vicinity of a boot inner side of the recessed portion, there being one projection at the boot receiving portion of the outer joint member of the shaft.

14. The constant velocity universal joint according to claim 13, wherein the projection is opposed to the circumferential clamp groove and is located at a position closer to a boot outer side of the small-diameter portion in an axial direction than a center of the circumferential clamp groove in the axial direction.

15. The constant velocity universal joint according to claim 14,
wherein the protruding portion has a height dimension such that the protruding portion is brought into close contact or into contact with the recessed portion to which the protruding portion is fitted, and
wherein a cylindrical surface of the inner peripheral surface of the small-diameter mounting portion is fitted with interference to the cylindrical surface of the boot receiving portion, and fastening by the second fastening clamp causes the projection of the boot receiving portion to bite into the cylindrical surface of the inner peripheral surface of the small-diameter mounting portion from a radially inner side of the boot, to thereby cause the boot receiving portion of the shaft having the cylindrical surface and the small-diameter mounting portion having the cylindrical surface to be fixed in close contact with each other.

16. The constant velocity universal joint according to claim 15,
wherein a height of the projection of the boot receiving portion is set equal to or more than 10% and equal to or less than 35% of a thickness of the small-diameter mounting portion which is mounted to the boot receiving portion,
wherein a width in the axial direction of the projection is set equal to or less than 10% of the width of the circumferential clamp groove, and
wherein a length in the axial direction of a close-contact fixing portion where the cylindrical surface of the boot receiving portion and the cylindrical surface of the inner peripheral surface of the small-diameter mounting portion contact each other is set equal to or more than 65% of the width of the circumferential clamp groove.

17. The constant velocity universal joint according to claim 14,
wherein a height of the projection of the boot receiving portion is set equal to or more than 10% and equal to or less than 35% of a thickness of the small-diameter mounting portion which is mounted to the boot receiving portion,
wherein a width in the axial direction of the projection is set equal to or less than 10% of the width of the circumferential clamp groove, and
wherein a length in the axial direction of a close-contact fixing portion where the cylindrical surface of the boot receiving portion and a cylindrical surface of the inner peripheral surface of the small-diameter mounting portion contact each other is set equal to or more than 65% of the width of the circumferential clamp groove.

18. The constant velocity universal joint according to claim 13,
wherein the protruding portion has a height dimension such that the protruding portion is brought into close contact or into contact with the recessed portion to which the protruding portion is fitted, and
wherein a cylindrical surface of the inner peripheral surface of the small-diameter mounting portion is fitted with interference to the cylindrical surface of the boot receiving portion, and fastening by the second fastening clamp causes the projection of the boot receiving portion to bite into the cylindrical surface of the inner peripheral surface of the small-diameter mounting portion from a radially inner side of the boot, to thereby cause the boot receiving portion of the shaft having the cylindrical surface and the small-diameter mounting portion having the cylindrical surface to be fixed in close contact with each other.

19. The constant velocity universal joint according to claim 18,
wherein a height of the projection of the boot receiving portion is set equal to or more than 10% and equal to or less than 35% of a thickness of the small-diameter mounting portion which is mounted to the boot receiving portion, wherein a width in an axial direction of the projection is set equal to or less than 10% of the width of the circumferential clamp groove, and wherein a length in the axial direction of a close-contact fixing portion where the cylindrical surface of the boot receiving portion and the cylindrical surface of the inner peripheral surface of the small-diameter mounting portion contact each other is set equal to or more than 65% of the width of the circumferential clamp groove.

20. The constant velocity universal joint according to claim 13, wherein a height of the projection of the boot receiving portion is set equal to or more than 10% and equal to or less than 35% of a thickness of the small-diameter mounting portion which is mounted to the boot receiving portion, wherein a width in an axial direction of the projection is set equal to or less than 10% of the width of the circumferential clamp groove, and wherein a length in the axial direction of a close-contact fixing portion where the cylindrical surface of the boot receiving portion and a cylindrical surface of the inner peripheral surface of the small-diameter mounting portion contact each other is set equal to or more than 65% of the width of the circumferential clamp groove.

21. The constant velocity universal joint according to claim 13, wherein the boot comprises thermoplastic polyester elastomer having a type-D durometer hardness, which is defined by JIS K6253, of equal to or more than 35 and equal to or less than 55.

22. The constant velocity universal joint according to claim 13, wherein a cylindrical surface of the inner peripheral surface of the small-diameter mounting portion has at least one projection extending therefrom, and wherein a height of the at least one projection is smaller than a height of the protruding portion.

* * * * *